US012254801B2

(12) United States Patent
Choi et al.

(10) Patent No.: US 12,254,801 B2
(45) Date of Patent: Mar. 18, 2025

(54) ELECTRONIC DEVICE INCLUDING DISPLAY AND METHOD FOR OPERATING SAME

(71) Applicant: SAMSUNG ELECTRONICS CO., LTD., Suwon-si (KR)

(72) Inventors: Gwangho Choi, Suwon-si (KR); Seongmin Je, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 43 days.

(21) Appl. No.: 17/943,626

(22) Filed: Sep. 13, 2022

(65) Prior Publication Data

US 2023/0083516 A1 Mar. 16, 2023

Related U.S. Application Data

(63) Continuation of application No. PCT/KR2022/012445, filed on Aug. 19, 2022.

(30) Foreign Application Priority Data

Sep. 1, 2021 (KR) ........................ 10-2021-0116165

(51) Int. Cl.
*G09G 3/00* (2006.01)

(52) U.S. Cl.
CPC ..... *G09G 3/035* (2020.08); *G09G 2320/0646* (2013.01); *G09G 2320/0666* (2013.01); *G09G 2360/141* (2013.01)

(58) Field of Classification Search
CPC ............. G09G 2360/141; G09G 3/035; G09G 2320/0646; G09G 2320/0666;
(Continued)

(56) References Cited

U.S. PATENT DOCUMENTS 11,125,610 B2 * 9/2021 Yoon ..................... G01J 1/4204
11,132,087 B2 9/2021 Lee et al.
(Continued)

FOREIGN PATENT DOCUMENTS

CN 103377611 B * 9/2017 ........... G06F 1/1652
EP 4053672 A1 * 9/2022 ........... G06F 1/1624
(Continued)

OTHER PUBLICATIONS

Search Report dated Nov. 18, 2022 issued in International Patent Application No. PCT/KR2022/012445.
(Continued)

*Primary Examiner* — Ricardo Osorio
(74) *Attorney, Agent, or Firm* — Nixon & Vanderhye, P.C.

(57) ABSTRACT

An electronic device according to various embodiments of the disclosure may include: a first housing, a second housing configured to be movable with respect to the first housing, a flexible display coupled to the first housing or the second housing to be movable together with a coupled housing, an illuminance sensor, and a processor, wherein the processor is configured to: measure an illuminance value using the illuminance sensor, determine an area of interest based on a movement of the flexible display, obtain color information on an image displayed in the area of interest, calculate a correction value using the obtained color information, correct the measured illuminance value based on the calculated correction value, and adjust luminance of the flexible display using the corrected illuminance value.

16 Claims, 12 Drawing Sheets

(58) Field of Classification Search
CPC ........... G09G 2320/0242; G09G 5/026; G09G 2340/14; G09G 2360/144
See application file for complete search history.

(56) References Cited

U.S. PATENT DOCUMENTS

| | | | | |
|---|---|---|---|---|
| 11,244,995 | B2 | 2/2022 | Cho et al. | |
| 11,250,749 | B2 | 2/2022 | Choi et al. | |
| 2013/0285921 | A1 | 10/2013 | Alberth, Jr. et al. | |
| 2014/0132158 | A1* | 5/2014 | Land | G09G 3/20 315/149 |
| 2018/0247588 | A1* | 8/2018 | Lee | G09G 3/3225 |
| 2020/0152724 | A1* | 5/2020 | Cho | H10K 59/40 |
| 2020/0242985 | A1* | 7/2020 | Cho | G06F 3/0412 |
| 2020/0265799 | A1 | 8/2020 | Choi et al. | |
| 2021/0090509 | A1* | 3/2021 | Zheng | H03F 3/087 |
| 2021/0200366 | A1 | 7/2021 | Bok et al. | |
| 2021/0223952 | A1 | 7/2021 | Oh et al. | |
| 2021/0248942 | A1 | 8/2021 | Yoon et al. | |
| 2022/0099485 | A1* | 3/2022 | Meng | G01J 1/4228 |

FOREIGN PATENT DOCUMENTS

| | | | | |
|---|---|---|---|---|
| KR | 10-2020-0055330 | | | 5/2020 |
| KR | 20200055330 | A | * | 5/2020 |
| KR | 10-2020-0143627 | | | 12/2020 |
| KR | 10-2021-0083611 | | | 7/2021 |
| KR | 10-2021-0085200 | | | 7/2021 |
| KR | 20210083611 | A | * | 7/2021 |
| KR | 10-2021-0158482 | | | 12/2021 |

OTHER PUBLICATIONS

Office Action dated Jan. 20, 2025 in Korean Patent Application No. 10-2021-0116165 and English-language translation.

* cited by examiner

ELECTRONIC DEVICE INCLUDING DISPLAY AND METHOD FOR OPERATING SAME

CROSS-REFERENCE TO RELATED APPLICATIONS

This application is a continuation of International Application No. PCT/KR2022/012445 designating the United States, filed on Aug. 19, 2022, in the Korean Intellectual Property Receiving Office and claiming priority to Korean Patent Application No. 10-2021-0116165, filed on Sep. 1, 2021, in the Korean Intellectual Property Office, the disclosures of which are incorporated by reference herein in their entireties.

BACKGROUND

Field

The disclosure relates to an electronic device including a display, and a method.

Description of Related Art

Various types of electronic devices have recently been developed. Flexible displays that are bendable, foldable, or rollable and then usable have been developed, and electronic devices including such displays have become diversified.

An electronic device including a display may include an illuminance sensor to improve visibility, may measure external illuminance thereby, and may adjust the configuration (for example, luminance) of the display based on the measure illuminance.

When an electronic device including a display has no display movement, an area of interest for measuring peripheral illuminance may not change. If the area of interest does not change, the electronic device may compensate for peripheral illuminance by considering only the image to be displayed on the display. However, if the display moves and changes the area of interest, the electronic device may fail to accurately measure the peripheral illuminance, and a correction value generated using the incorrect illuminance may make it impossible to adjust the luminance of the display.

SUMMARY

Embodiments of the disclosure may provide a method and a device for controlling configuration of a display in response to peripheral illuminance changed by a movement of a flexible display.

An electronic device according to various example embodiments of the disclosure may include: a first housing, a second housing configured to be movable with respect to the first housing, a flexible display coupled to the first housing or the second housing to be movable together with a coupled housing, an illuminance sensor, and a processor, wherein the processor is configured to: measure an illuminance value using the illuminance sensor, determine an area of interest based on a movement of the flexible display, obtain color information on an image displayed in the area of interest, calculate a correction value using the obtained color information, correct the measured illuminance value based on the calculated correction value, and adjust luminance of the flexible display using the corrected illuminance value.

A method of operating an electronic device according to various example embodiments of the disclosure may include: measuring an illuminance value using an illuminance sensor, determining an area of interest based on a movement of a flexible display, obtaining color information on an image displayed in the area of interest, calculating a correction value using the obtained color information, correcting the measured illuminance value based on the calculated correction value, and adjusting luminance of the flexible display using the corrected illuminance value.

According to various example embodiments of the disclosure, an electronic device may adjust (or control) a configuration value (for example, luminance value) of a display using a correction value generated by accurately measuring peripheral illuminance even if the display moves.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
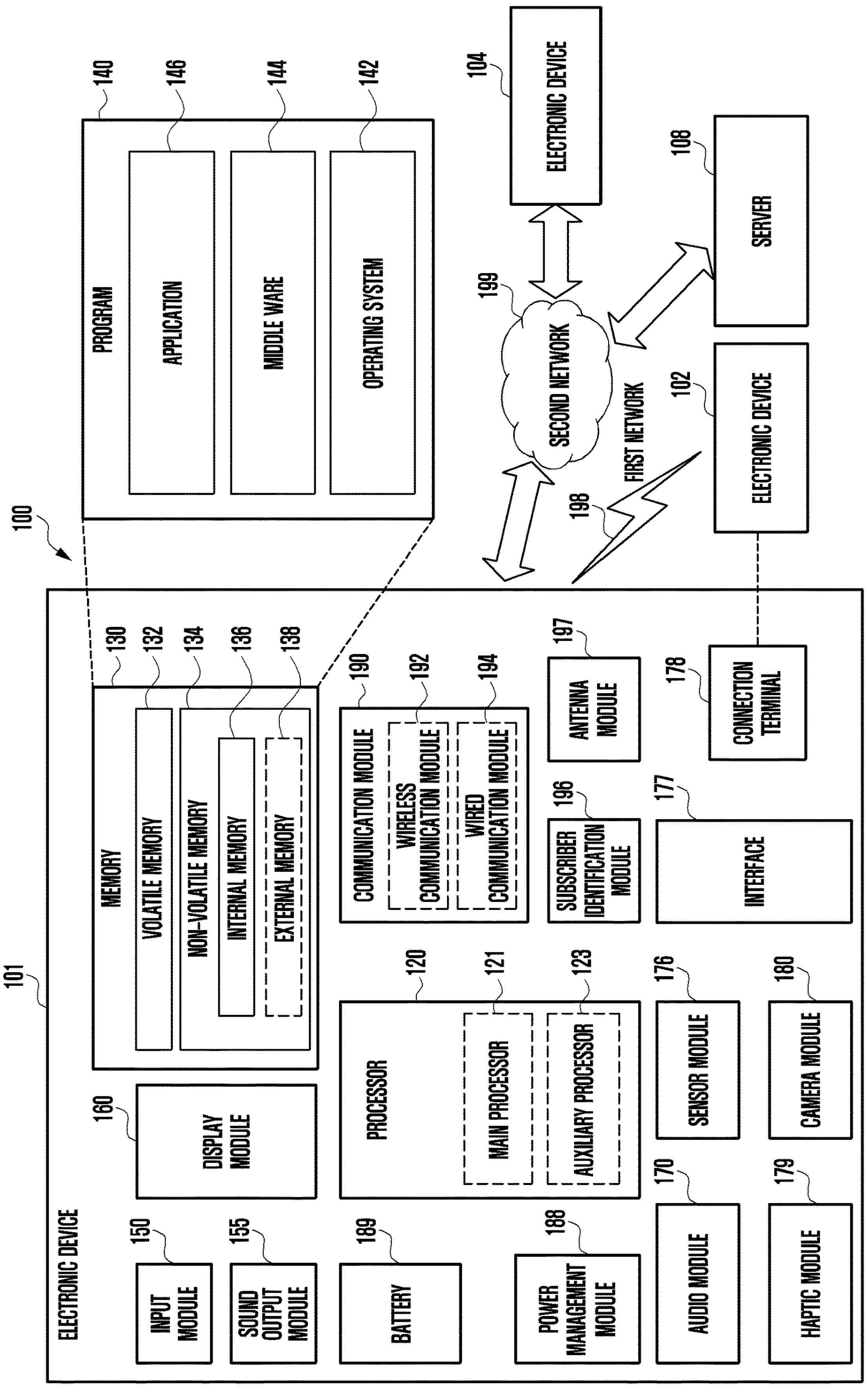
FIG. 1 is a block diagram illustrating an example electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network).

According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as “A or B,” “at least one of A and B,” “at least one of A or B,” “A, B, or C,” “at least one of A, B, and C,” and “at least one of A, B, or C,” may include any one of, or all possible combinations of the items enumerated together in a corresponding one of the phrases. As used herein, such terms as “1st” and “2nd,” or “first” and “second” may be used to simply distinguish a corresponding component from another, and does not limit the components in other aspect (e.g., importance or order). It is to be understood that if an element (e.g., a first element) is referred to, with or without the term “operatively” or “communicatively”, as “coupled with,” “coupled to,” “connected with,” or “connected to” another element (e.g., a second element), the element may be coupled with the other element directly (e.g., wiredly), wirelessly, or via a third element.

As used in connection with various embodiments of the disclosure, the term “module” may include a unit implemented in hardware, software, or firmware, or any combination thereof, and may interchangeably be used with other terms, for example, “logic,” “logic block,” “part,” or “circuitry”. A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the “non-transitory” storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer’s server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
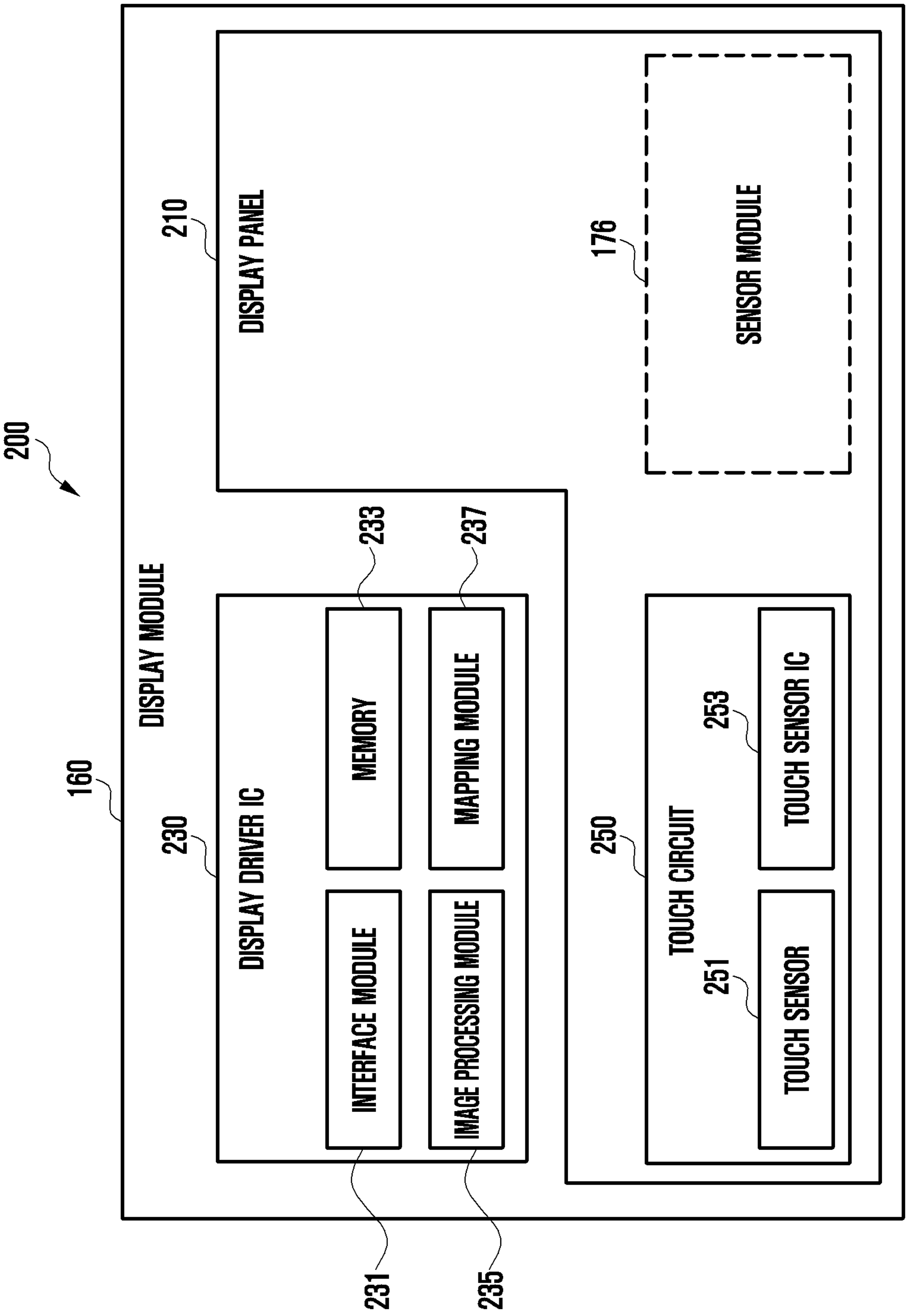
FIG. 2 is a block diagram illustrating an example configuration of a display module according to various embodiments.

FIG. 2 is a block diagram 200 illustrating an example configuration of the display module 160 according to various embodiments. Referring to FIG. 2, the display module 160 may include a display 210 and a display driver integrated circuit (DDI) 230 to control the display 210. The DDI 230 may include an interface module (e.g., including interface circuitry) 231, memory 233 (e.g., buffer memory), an image processing module (e.g., including processing circuitry) 235, and/or a mapping module (e.g., including various processing circuitry and/or executable program instructions) 237. The DDI 230 may receive image information that contains image data or an image control signal corresponding to a command to control the image data from another component of the electronic device 101 via the interface module 231. For example, according to an embodiment, the image information may be received from the processor 120 (e.g., the main processor 121 (e.g., an application processor)) or the auxiliary processor 123 (e.g., a graphics processing unit) operated independently from the function of the main processor 121. The DDI 230 may communicate, for example, with touch circuitry 250 or the sensor module 176 via the interface module 231. The DDI 230 may also store at least part of the received image information in the memory 233, for example, on a frame by frame basis.

The image processing module 235 may include various processing circuitry and perform pre-processing or post-processing (e.g., adjustment of resolution, brightness, or size) with respect to at least part of the image data. According to an embodiment, the pre-processing or post-processing may be performed, for example, based at least in part on one or more characteristics of the image data or one or more characteristics of the display 210.

The mapping module 237 may include various processing circuitry and/or executable program instructions, and generate a voltage value or a current value corresponding to the image data pre-processed or post-processed by the image processing module 235. According to an embodiment, the generating of the voltage value or current value may be performed, for example, based at least in part on one or more attributes of the pixels (e.g., an array, such as an RGB stripe or a pentile structure, of the pixels, or the size of each subpixel). At least some pixels of the display 210 may be driven, for example, based at least in part on the voltage value or the current value such that visual information (e.g., a text, an image, or an icon) corresponding to the image data may be displayed via the display 210.

According to an embodiment, the display module 160 may further include the touch circuitry 250. The touch circuitry 250 may include a touch sensor 251 and a touch sensor IC 253 to control the touch sensor 251. The touch sensor IC 253 may control the touch sensor 251 to sense a touch input or a hovering input with respect to a certain position on the display 210. To achieve this, for example, the touch sensor 251 may detect (e.g., measure) a change in a signal (e.g., a voltage, a quantity of light, a resistance, or a quantity of one or more electric charges) corresponding to the certain position on the display 210. The touch circuitry 250 may provide input information (e.g., a position, an area, a pressure, or a time) indicative of the touch input or the hovering input detected via the touch sensor 251 to the processor 120. According to an embodiment, at least part (e.g., the touch sensor IC 253) of the touch circuitry 250 may be formed as part of the display 210 or the DDI 230, or as part of another component (e.g., the auxiliary processor 123) disposed outside the display module 160.

According to an embodiment, the display module 160 may further include at least one sensor (e.g., a fingerprint sensor, an iris sensor, a pressure sensor, or an illuminance sensor) of the sensor module 176 or a control circuit for the at least one sensor. In such a case, the at least one sensor or the control circuit for the at least one sensor may be embedded in one portion of a component (e.g., the display 210, the DDI 230, or the touch circuitry 250)) of the display module 160. For example, when the sensor module 176 embedded in the display module 160 includes a biometric sensor (e.g., a fingerprint sensor), the biometric sensor may obtain biometric information (e.g., a fingerprint image) corresponding to a touch input received via a portion of the display 210. As another example, when the sensor module 176 embedded in the display module 160 includes a pressure sensor, the pressure sensor may obtain pressure information corresponding to a touch input received via a partial or whole area of the display 210. According to an embodiment, the touch sensor 251 or the sensor module 176 may be disposed between pixels in a pixel layer of the display 210, or over or under the pixel layer.

Figure 3:
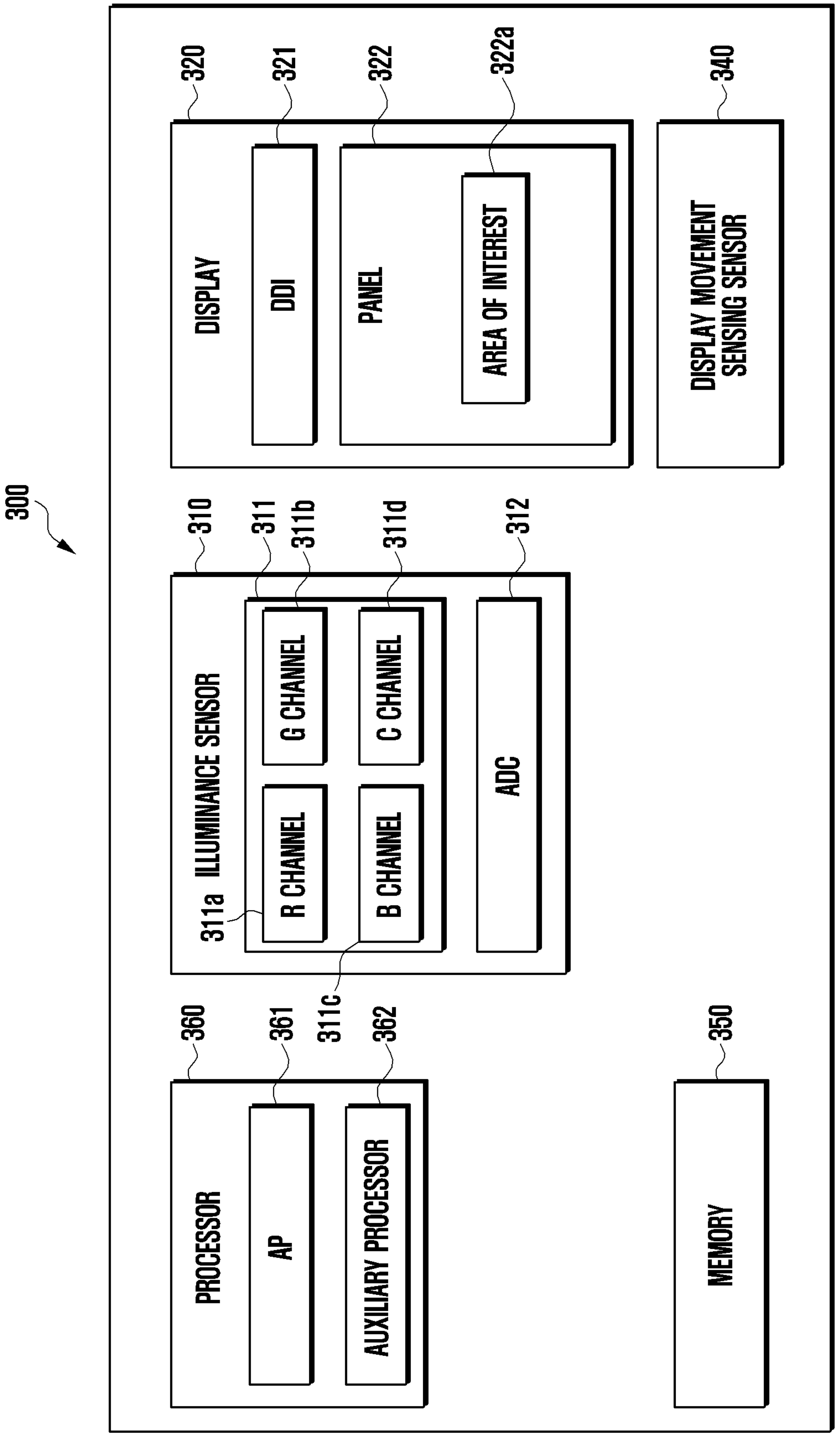
FIG. 3 is a block diagram illustrating an example configuration of an electronic device according to various embodiments.

FIG. 3 is a block diagram illustrating an example configuration of an electronic device according to various embodiments.

Referring to FIG. 3, an electronic device 300 (e.g., the electronic device 101 in FIG. 1) may include an illuminance sensor 310, a display 320 (e.g., a rollable display or a movable display), a display movement sensing sensor 340, a memory 350, and a processor (e.g., including processing circuitry) 360.

According to an embodiment, the illuminance sensor 310 may generate data used for identification of the illuminance around the electronic device 300. According to an embodiment, the illuminance sensor 310 may include at least one photodiode, and may be implemented as one module (e.g., ASIC). The illuminance sensor 310 may be subject to a molding (e.g., clear molding) process so that the internal elements thereof are protected.

According to an embodiment, the illuminance sensor 310 may include a light reception unit 311 including circuitry for reading an RGB value of a visible ray, and an analog-to-digital converter (ADC) 312 for digitalizing the RGB value, and may transmit the digitalized RGB value (ADC value) to the processor 360. For example, the light reception unit 311 may include a photodiode which reacts to visible rays (e.g., light having a wavelength of about 400-750 nm). The light reception unit 311 may further include a photodiode which receives infrared rays. The light reception unit 311 may generate a current due to a photoelectric effect when facing an external light resource. The ADC 312 may convert a current into digital data (e.g., an ADC value), and transfer the digital data to the processor 360. For example, when light is strong, data showing an illuminance having a high numerical value may be transferred to the processor 360, and when light is weak, data showing an illuminance having a relatively low numerical value may be transferred to the processor 360. The processor 360 may change data received from the illuminance sensor 310 into an illuminance, and may control a setting value (e.g., luminance or brightness) of the display 320, based on the illuminance.

According to an embodiment, the light reception unit 311 may include multiple channels capable of measuring light. The light reception unit 311 may include an R (red) channel 311*a* receiving reddish light (e.g., light having a wavelength of about 550-700 nm), a G (green) channel 311*b* receiving greenish light (e.g., light having a wavelength of about 450-650 nm), a B (blue) channel 311*c* receiving bluish light (e.g., light having a wavelength of about 400-550 nm), and/or a C (clear) channel 311*d* receiving white light (e.g., all of R, G, and B). At least one of the channels 311*a*, 311*b*, 311*c*, and 311*d* may include a photodiode. The R, G, and B channels 311*a*, 311*b*, and 311*c* may include filters allowing corresponding color light to transmit therethrough.

According to an embodiment, the illuminance sensor 310 may include, as well as a photodiode, various sensors based on light, such as a color detection sensor (e.g., a picker sensor), a flicker sensor, an image sensor, a photo plethysmography (PPG) sensor, a proximity sensor, an iris sensor, a spectrometer sensor, or an ultraviolet sensor.

According to an embodiment, the illuminance sensor 310 may be included in the display 320. Hereinafter, one illuminance sensor 310 will be described, but the electronic device 300 may include multiple illuminance sensors 310. When multiple illuminance sensors 310 are included, the electronic device 300 may adjust an illuminance value of the display by separately using same, or using a combination thereof.

According to an embodiment, the display 320 (e.g., the display module 160 in FIG. 1) may include a DDI 321 and a panel 322 (e.g., the display panel 210 in FIG. 2). The DDI 321 (e.g., the DDI 230 in FIG. 2) may control the panel 322 to display video information. The DDI 321 may control the panel 322 to output video information in a unit of frames. The DDI 321 may provide color information on a video (or an image) which is to be output (or is being output) to another element (e.g., the processor 360). For example, the color information may include color-on-pixel-ratio information (COPR) information. The COPR information may indicate a ratio of R/G/B (R value, G value, and B value) in video data to be output on a designated area (e.g., an area of interest) of the display 320. For example, the COPR information may indicate the average of each of R values, G values, and B values to be displayed in pixels included in the designated area, respectively. An average R value is a red value, and may be in a range of 0-255, an average G value is a green value, and may be in a range of 0-255, and an average B value is a blue value, and may be in a range of 0-255. For example, CORP information on an area displaying a white part included in a video to be displayed on the display 320 may have a value of (R, G, B: 255, 255, 255). The designated area may be, for example, an area 322*a* of interest, and may be distinguished by physical position information on the area or a coordinate value (e.g., a relative coordinate value, or an absolute coordinate value) of a pixel, stored in the memory 350.

According to an embodiment, the DDI 321 may adjust a setting value (e.g., luminance) of the display 320, based on a control of the processor 360. The DDI 321 may perform, based on a first command of the processor 360, an operation of adjusting a setting value (e.g., luminance) of the display 320 in real time according to an illuminance identified using the illuminance sensor 310. The DDI 321 may perform, based on a second command of the processor 360, an operation (hysteresis adjustment operation) of, when the illuminance identified using the illuminance sensor 310 belongs to a predetermined illuminance range, maintaining the setting value (e.g., luminance) of the display 320 and, when the illuminance identified using the illuminance sensor 310 falls out of the illuminance range, adjusting the setting value (e.g., luminance) of the display 320.

According to an embodiment, the DDI 321 may be omitted in the configuration of the electronic device 300, and thus the processor 360 may perform a function of the DDI 321.

According to an embodiment, the panel 322 may include the area 322*a* of interest. The area 322*a* of interest may be a partial area of the panel 322. The area 322*a* of interest may include at least a part of an FOV area of the illuminance sensor 310. Information on the area 322*a* of interest may be stored in the memory 350. The position of the area 322*a* of interest may be changed when the display is moved.

According to an embodiment, the display movement sensing sensor 340 may generate data used for determination of a movement of a flexible display. The display movement sensing sensor 340 may transmit the generated data to the processor 360. The processor 360 may determine at least one of a direction (e.g., the extension or reduction of the display) in which the display is moved, a movement speed, and a movement distance using the data received from the display movement sensing sensor 340. The processor 360 may determine at least one of a movement direction, a movement speed, and a movement distance using the display movement sensing sensor 340, for example by sensing a hole of a housing.

According to an embodiment, the memory 350 (e.g., the memory 130 in FIG. 1) may store instructions causing the processor 360 to perform a function described in the disclosure. The memory 350 may include a memory of the DDI 321, or at least a part of the memory. In an embodiment, the memory 350 may store a look-up table used for a real-time adjustment operation. For example, when a setting value (e.g., luminance) of the display is adjusted in real time, the processor 360 may identify, in the look-up table, a setting value code (e.g., luminance code) of the display corresponding to surrounding illuminance, and configure, as the setting value (e.g., luminance value) of the display 320, a display setting (e.g., luminance) corresponding to the identified code.

According to an embodiment, the processor 360 (e.g., the processor 120 in FIG. 1) may include various processing circuitry, for example, including an application processor (AP) 361 and/or an auxiliary processor 362, and may be operatively connected to the illuminance sensor 310, the display 320, the display movement sensing sensor 340, and the memory 350. The processor 360 may adjust a setting (e.g., luminance) of the display 320, based on data received from the illuminance sensor 310 and/or the display movement sensing sensor 340. The AP 361 may change data received from the illuminance sensor 310 into an illuminance value, and correct the illuminance value using data received from the display 320 (e.g., the DDI 321). The auxiliary processor 362 (e.g., a sensor hub processor) may control the overall operation of a sensor module (e.g., the sensor module 176 in FIG. 1). The auxiliary processor 362 may be used to collect data from a sensor module and process same using a power lower than that of the AP 361. For example, the auxiliary processor may change data received from the illuminance sensor 310 into an illuminance value, read a luminance corresponding to the illuminance value in the look-up table, and transfer the luminance to the DDI 321. According to an embodiment, the auxiliary processor 362 may be omitted in the configuration of the electronic device 300, and thus the AP 361 may perform a function of the auxiliary processor 362.

According to an embodiment, the processor 360 (e.g., the AP 361 and/or the auxiliary processor 362) may change data received from the illuminance sensor 310 into an illuminance value. The processor 360 may perform a real-time adjustment operation or a hysteresis adjustment operation, at least based on the illuminance value.

According to an embodiment, the processor 360 (e.g., the AP 361 and/or the auxiliary processor 362) may configure a measurement time (e.g., an integration time) for which the illuminance sensor 310 obtains light, and a measurement period, based on a period by which the display 320 is turned on and turn off, and/or a turn-off ratio (e.g., AMOLED off ratio (AOR)). For example, the display 320 may display a frame while being repeatedly turned on and turned off several times. In an embodiment, the illuminance around the electronic device 300 may be distorted when the display 320 is turned on. In order to prevent and/or reduce this distortion, the processor 360 may change, into an illuminance value, data received from the illuminance sensor 310 for a time for which the display 320 is turned off.

According to an embodiment, the processor 360 (e.g., the AP 361 and/or the auxiliary processor 362) may measure the illuminance around the electronic device 300 using data received from the illuminance sensor 310. The processor 360 may correct an illuminance value obtained as a result of measurement, based on color information on an image displayed on the panel 322 (e.g., the area 322*a* of interest), thereby preventing and/or reducing a distortion of surrounding illuminance caused by the movement of the display 320.

Figure 4A:
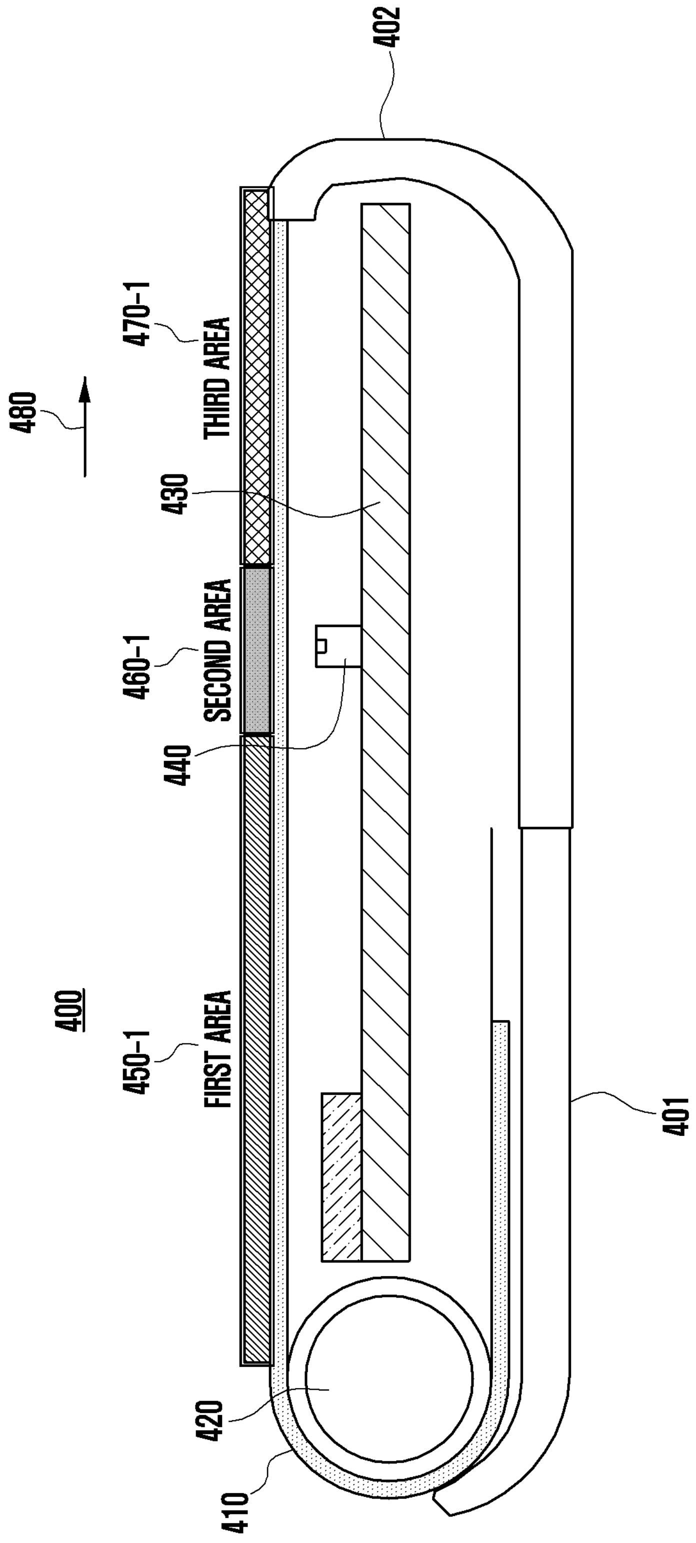
FIG. 4A is a cross-sectional view illustrating an electronic device before a display is extended (or after the display is reduced), according to various embodiments.
Figure 4B:
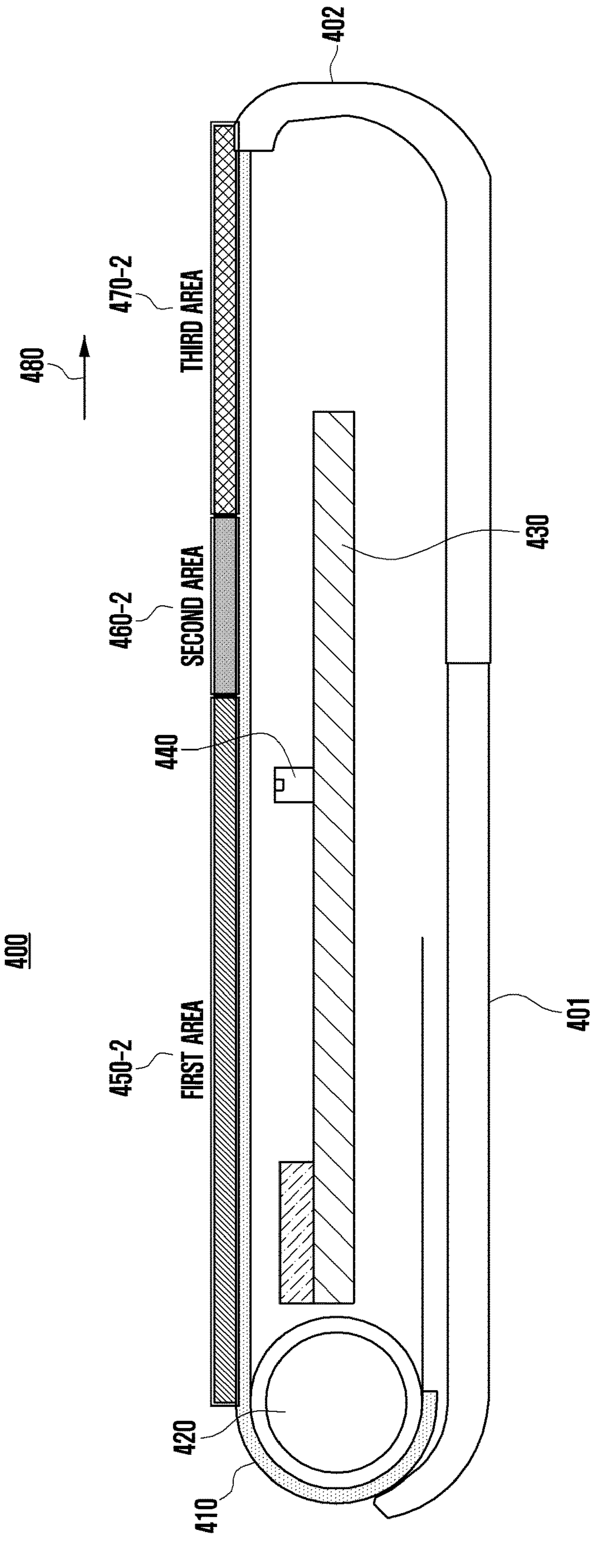
FIG. 4B is a cross-sectional view illustrating an electronic device after a display is extended (or before the display is reduced) according to various embodiments.

FIG. 4A is a cross-sectional view illustrating an electronic device before a display is extended (or after the display is reduced) according to various embodiments, and FIG. 4B is a cross-sectional view illustrating an electronic device after a display is extended (or before the display is reduced) according to various embodiments.

Referring to FIG. 4A and FIG. 4B, an electronic device 400 (e.g., the electronic device 300 in FIG. 3) may include a first housing 401, a second housing 402, and a rollable display 410 (e.g., the display 320 in FIG. 3). In the electronic device 400, the second housing 402 may be movable with respect to the first housing 401. Alternatively, in the electronic device 400, the first housing 401 may be movable with respect to the second housing 402. The rollable display 410 may be coupled to the first housing 401 or the second housing 402, and may move together with the first housing 401 or the second housing 402 according to driving of a motor 420. When a user, for example, presses a particular hardware/software key or makes a particular gesture, the electronic device 400 may drive the motor 420 to extend (e.g., roll out) or reduce (e.g., roll in) the rollable display 410. As another example, a user may extend or reduce the rollable display 410 by pushing or pulling same by force.

According to an embodiment, another hardware element for driving the rollable display 410 may be disposed on a printed circuit board 430 in the electronic device 400. For example, at least some of the illuminance sensor 440 (e.g., the illuminance sensor 310 in FIG. 3), a display driver, a memory (e.g., the memory 350 in FIG. 3), a display movement sensing sensor (e.g., the display movement sensing sensor 340 in FIG. 3), and a processor (e.g., the processor 360 in FIG. 3) may be arranged on the PCB 430.

According to an embodiment, a video (or image) displayed on the rollable display 410 may move according to the movement of the rollable display 410. Alternatively/in addition, the video (or image) displayed on the rollable display 410 may become larger or smaller.

Referring to FIG. 4A, before the display is extended (or, after the display is reduced), an image displayed on the rollable display 410 may include a first area 450-1, a second area 460-1, and a third area 470-1, and the second area 460-1 may be positioned in an FOV area of the illuminance sensor 440.

According to an embodiment, when the rollable display 410 is extended, the position and/or size of a first area 450-2, a second area 460-2, and a third area 470-2 may be changed. Referring to FIG. 4B, it may be noted that the first area 450-2, the second area 460-2, and the third area 470-2 have all been extended, and the positions thereof have been changed in a first direction 480 (e.g., from the left to the right). In addition, the first area 450-2 may be positioned in the FOV area of the illuminance sensor 440 according to the extension of the rollable display 410.

Figure 5:
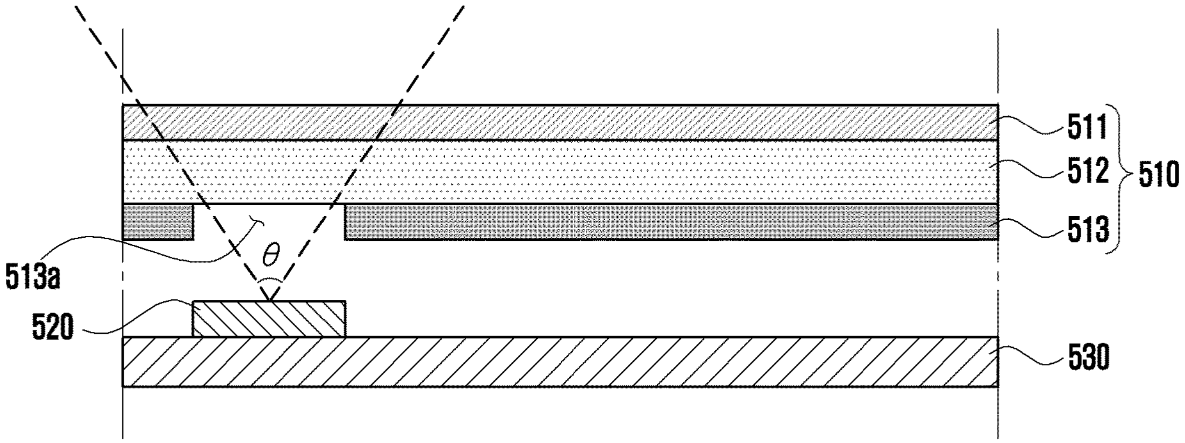
FIG. 5 is a cross-sectional view of a display and an illuminance sensor disposed below the display according to various embodiments.

FIG. 5 is a cross-sectional view of a display and an illuminance sensor disposed below the display according to various embodiments.

Referring to FIG. 5, a display 510 and an illuminance sensor 520 may be arranged in the electronic device described above with reference to FIG. 4.

According to an embodiment, the display 510 may include a first protection cover 511, a display panel 512 (e.g., the display panel 210 in FIG. 2), and a second protection cover 513. The first protection cover 511 may be attached to a front surface of the display panel 512, and may be implemented by, for example, a flexible and transparent material (e.g., colorless polyimide (CPI)). The second protection cover 513 may be attached to a rear surface of the display panel 512, and may include a metal layer (e.g., copper (Cu) sheet) and/or a light shielding layer (e.g., a black embossed layer). The illuminance sensor 520 (e.g., ambient light sensor (ALS)) may be disposed below the second protection cover 513, and disposed on a substrate assembly 530. An opening 513*a* may extend through at least a part of the second protection cover 513 disposed above the illuminance sensor 520, so that the illuminance sensor 520 is able to sense external light. The opening part 513*a* may have a position and/or a size corresponding to a field-of-view (FOV) angle (θ) of the illuminance sensor 520. According to an embodiment, an area of interest on the display panel 512 may have a position and/or a size corresponding to the FOV angle (θ).

In an embodiment, although not illustrated, the illuminance sensor 520 may include a package type further including a light emitting unit. For example, the illuminance sensor 520 including a light emitting unit may be operated as a proximity sensor. In an embodiment, although not illustrated, the illuminance sensor 520 may be included in a display panel (e.g., the display panel 210 in FIG. 2). For example, at least some of pixels included in the display panel 210 may include a light reception unit so as to measure illuminance. In this case, the opening part 513*a* may not exist. In addition, a sensor area may have a position and/or size corresponding to a pixel including a light reception unit. Furthermore, a person skilled in the art would understand that the type of the illuminance sensor 520 is not limited thereto.

Figure 6:
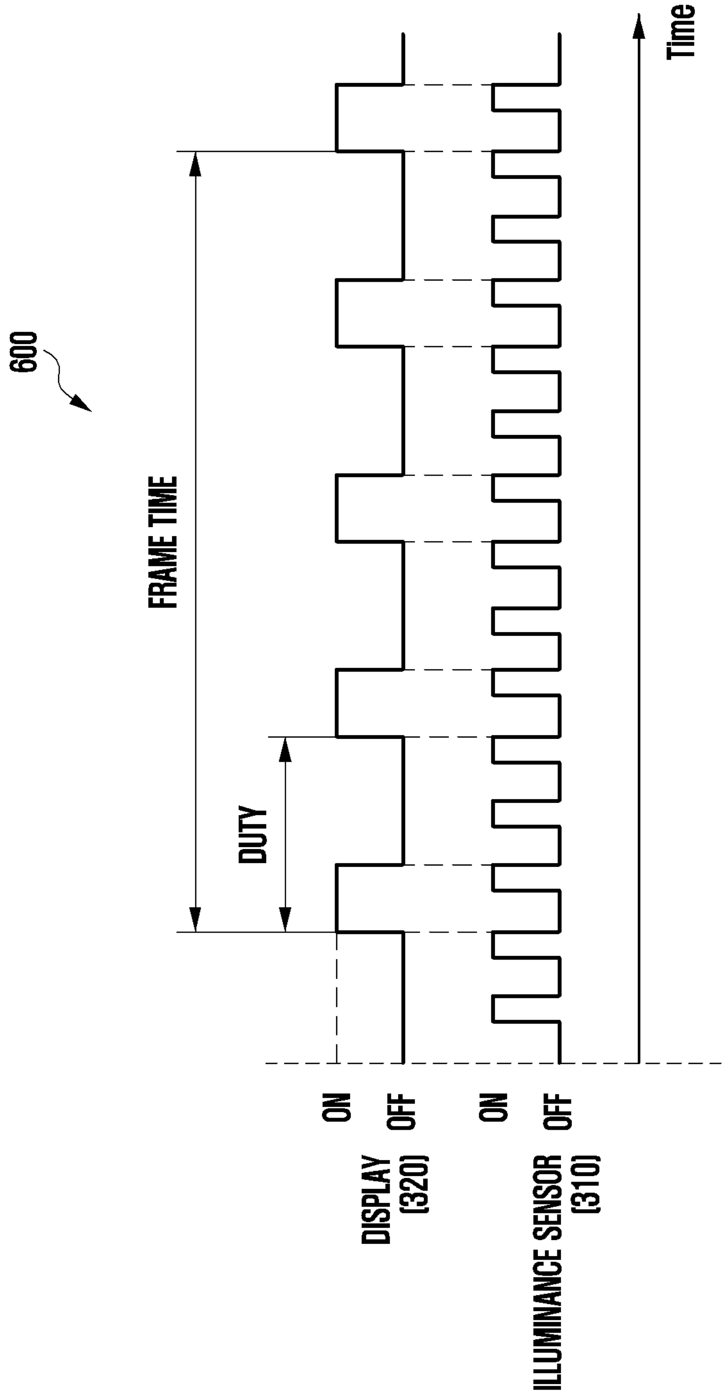
FIG. 6 is a timing diagram illustrating an example operation of illuminance measurement based on a period by which a display is turned on and off according to various embodiments.

FIG. 6 is a timing diagram 600 illustrating an example operation of illuminance measurement based on a period by which a display is turned on and off according to various embodiments.

Referring to FIG. 6, a display (e.g., the display 320 in FIG. 3) may be repeatedly turned on and off several times for a time for which one frame is displayed. A time (e.g., 16.6 ms) for which scanning lines (e.g., data wires, gate wiring, and power wiring) of the display 320 are all sequentially operated may be the time (a frame time) for which one frame is displayed. The display 320 may be repeatedly turned on and turned off several times (e.g., four times) for one frame time. A single turn-on and turn-off time may be called a duty, and a ratio of a turn-on time with respect to the entire time of one duty (e.g., 4.16 ms) may be called a duty ratio.

According to an embodiment, an illuminance sensor (e.g., the illuminance sensor 310 in FIG. 3) may be repeatedly turned on and off several times for one frame time. A period by which the illuminance sensor 310 is turned on and off may be shorter than a period (or a scan rate of the display) by which the display 320 is turned on and off.

According to an embodiment, a processor (e.g., the processor 360 in FIG. 3) may configure a period by which the display 320 is turned on and off, and a duty ratio. The processor 360 may configure a turn-on time of the illuminance sensor 310 to be shorter than a turn-on time of the display 320 so that the illuminance sensor 310 is turned on at a time point at which the display 320 is turned off. In order to prevent and/or reduce this distortion, the processor 360 may calculate an illuminance value using data received from the illuminance sensor 310 for a time for which the display 320 is turned off. The processor 360 may exclude data at the time of calculation of an illuminance value, the data being received from the illuminance sensor 310 for a time for which the display 320 is turned on.

Figure 7:
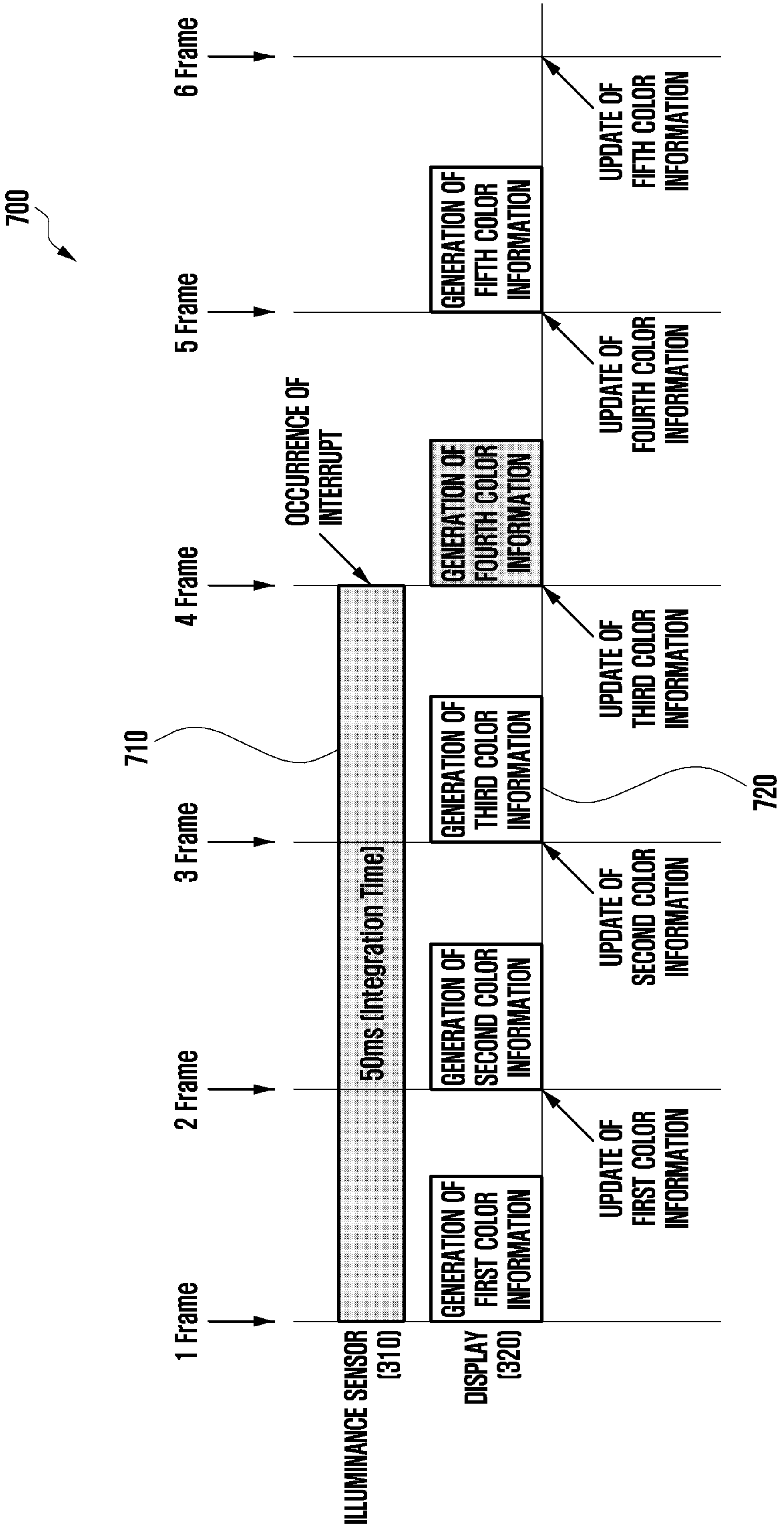
FIG. 7 is a diagram illustrating an example operation of illuminance correction based on color information on an image according to various embodiments.

FIG. 7 is a diagram 700 illustrating an example operation of illuminance correction based on color information on an image according to various embodiments.

Referring to FIG. 7, the illuminance sensor 310 may receive light for a designated measurement time (e.g., 50 ms) 710, convert the received light into data, and provide the data to the processor 360. The illuminance sensor 310 may generate an interrupt signal at a time point of providing data.

According to an embodiment, the display 320 (e.g., the DDI 321) may display an image on a panel (e.g., the panel 322 in FIG. 3) in a unit of frames every designated frame time (e.g., 16.6 ms), and may generate color information (e.g., first color information, second color information, and third color information) corresponding to a frame to be displayed on the panel 322, and provide the color information to the processor 360 (e.g., the AP 361 or the auxiliary processor 362).

According to an embodiment, the processor 360 may store, in a memory (e.g., the memory 350 in FIG. 3), the color information received from the display 320 (e.g., the DDI 321). When generation of an interrupt signal is recognized, the processor 360 may identify color information in the memory 350. The processor 360 may identify multiple pieces of color information in the memory 350.

According to an embodiment, the processor 360 may determine an area of interest (e.g., the area 332*a* of interest in FIG. 3) on the panel 322, and obtain color information on the area of interest. The processor 360 may identify a movement speed and/or movement distance of the display so as to determine the position of an area of interest. The processor 360 may obtain color information on the determined area of interest. The processor 360 may store the obtained color information on the area of interest in the memory 350, and identify same when it is needed.

According to an embodiment, the processor 360 may measure the illuminance around the electronic device 300 using data received from the illuminance sensor 310, and correct an illuminance value obtained as a result of the measurement, based on color information identified according to interrupt occurrence. For example, the processor 360 may obtain an R ratio (COPR R), a G ratio (COPR G), and a B ratio (COPR B) with respect to the area 322*a* of interest from the memory 350. The processor 360 may calculate a correction value, based on information on the obtained R, G, and B ratios, and correct the measured illuminance value, based on the calculated correction value. The processor 360 may calculate a correction value in further consideration of a weight value as well as information on the obtained R, G, and B ratios, and correct the measured illuminance value, based on the calculated correction value.

According to an embodiment, the processor 360 may adjust a setting (e.g., luminance) of the display using the corrected illuminance value.

Figure 8:
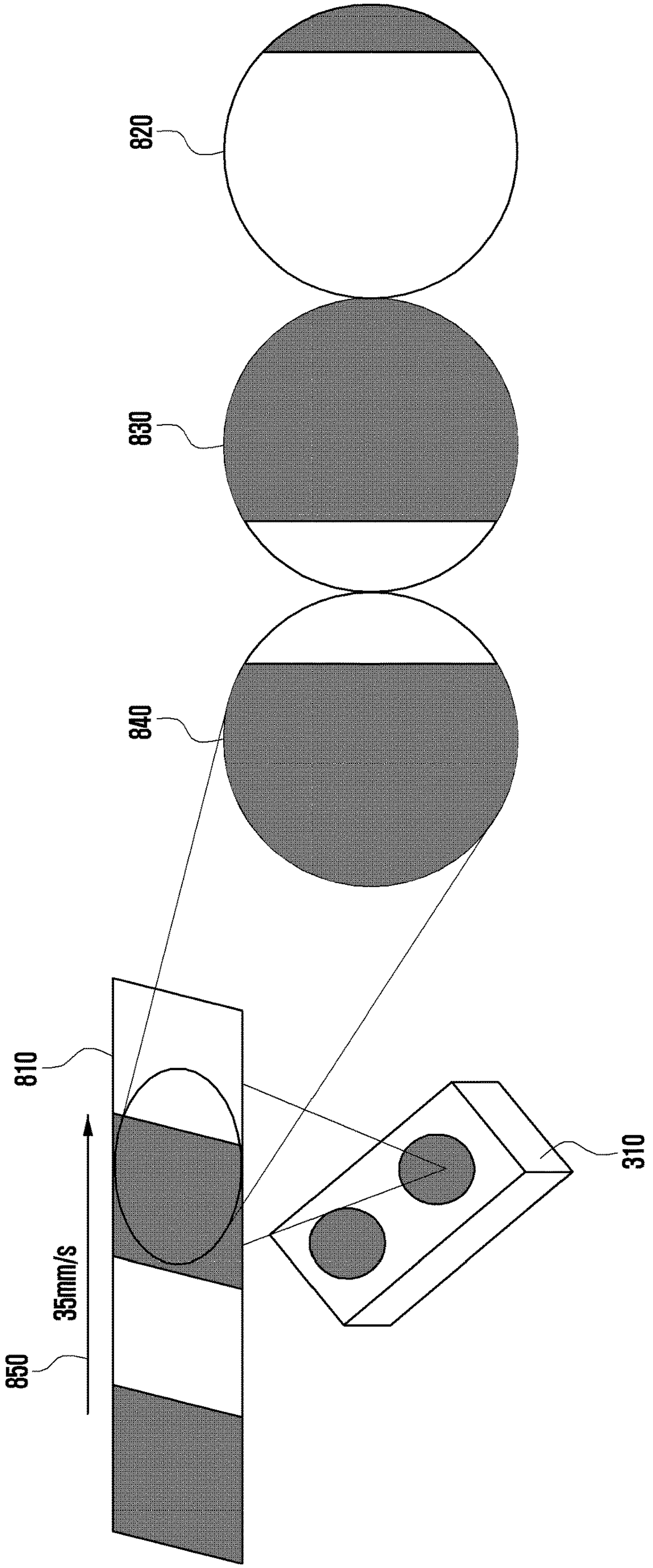
FIG. 8 is a diagram illustrating an example of change of an image in an area of interest according to various embodiments.

FIG. 8 is a diagram illustrating an example of change of an image in an area of interest according to various embodiments.

According to an embodiment, an electronic device (e.g., the electronic device 300 in FIG. 3) may include an illuminance sensor (e.g., the illuminance sensor 310 in FIG. 3), and at least a part of a field-of-view (FOV) area of the illuminance sensor 310 may be included in an area of interest. FIG. 8 illustrates an example that the FOV area of the illuminance sensor 310 is an area of interest, but the disclosure is not limited thereto.

Referring to FIG. 8, an image 810 displayed on a display may also move according to the movement of the display. The display may be automatically moved by driving of a motor, or may be manually moved by a manipulation of a user. An image of the FOV area of the illuminance sensor 310 may also be changed according to the movement of the display. FIG. 8 illustrates a case where, when the display is moved, the image 810 moves in a first direction 850 (e.g., from the left to the right, and an image of the FOV area of the illuminance sensor 310 also moves from a first area 840 to a second area 830 and a third area 820 in that order.

According to an embodiment, the electronic device 300 may determine an area of interest moving according to the movement of the display. The electronic device 300 may determine the moving area of interest, based on, for example, a driving speed of a motor. For example, when the movement speed of the display by a motor is 35 mm/s, the electronic device 300 may determine that an area of interest has moved 1.4 mm after 40 ms. As another example, the electronic device 300 may determine a distance by which the display has moved, by means of a display movement sensing sensor (e.g., the display movement sensing sensor 340 in FIG. 3), so as to calculate the coordinates of the area of interest. For example, the electronic device 300 may identify a time of flight by means of the display movement sensing sensor 340 so as to calculate the distance by which the display has moved. The display movement sensing sensor 340 may include a TOF sensor capable of measuring distance. Light (or a signal) emitted from a transceiver of the TOF sensor may be reflected by a structure (e.g., an electronic component) in the electronic device, and then the reflected light may be received by a receiver of the TOF sensor, and one of the TOF sensor or the structure in the electronic device may be disposed at a first housing (e.g., the first housing 401 in FIG. 4) or a second housing (e.g., the second housing 402 in FIG. 4) of the electronic device, and may be moved according to the movement of the display. The electronic device 300 may measure the distance between the TOF sensor or the structure in the electronic device using a time taken for light which is emitted from the transmitter, is reflected by the structure in the electronic device, and returns to the receiver, so as to calculate the distance by which the display has moved. As another example, the electronic device 300 may calculate a movement speed of the display using inductance. The display movement sensing sensor 340 may include an extension sensing sensor, and the extension sensing sensor may be configured by at least one magnet and/or Hall sensors. The magnet may be implemented by a permanent magnet and/or an electromagnet. The Hall sensors arranged in the electronic device may sense the magnet moving according to the movement of the display. The electronic device 300 may calculate the distance by which the display has moved, using the gaps between the Hall sensors having sensed the magnet through the Hall sensors.

Figure 9A:
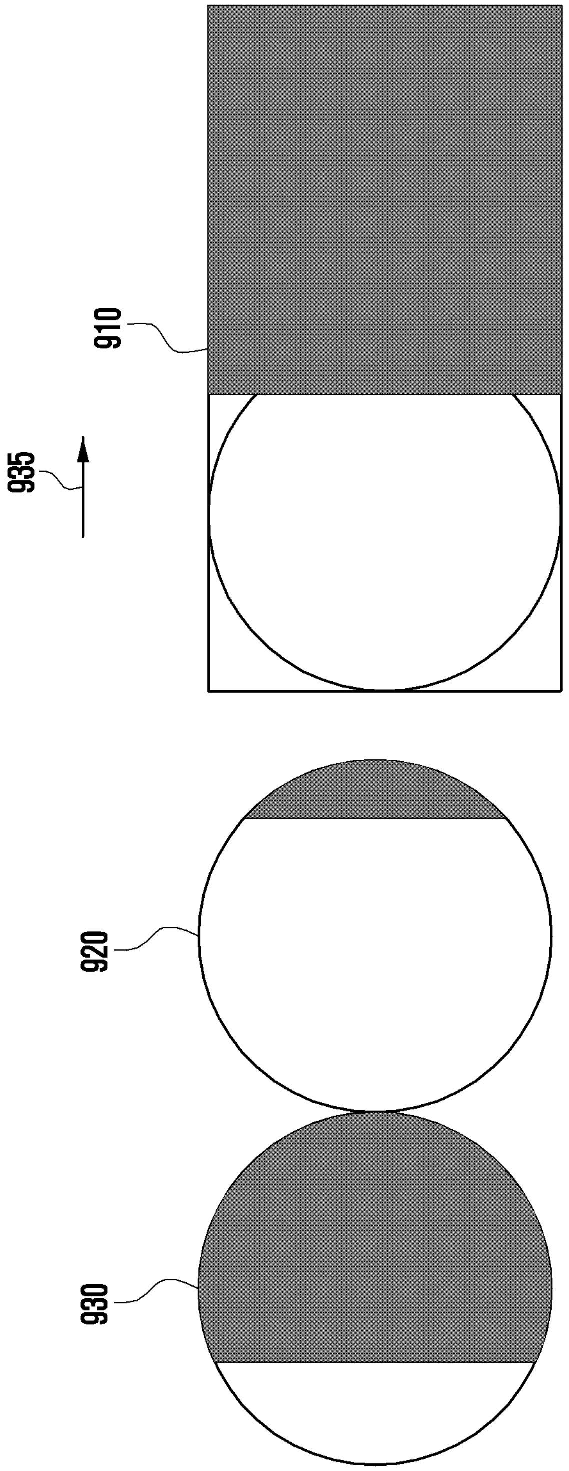
FIG. 9A and FIG. 9B are diagrams illustrating an example correction value reflecting a movement of a display according to various embodiments.
Figure 9B:
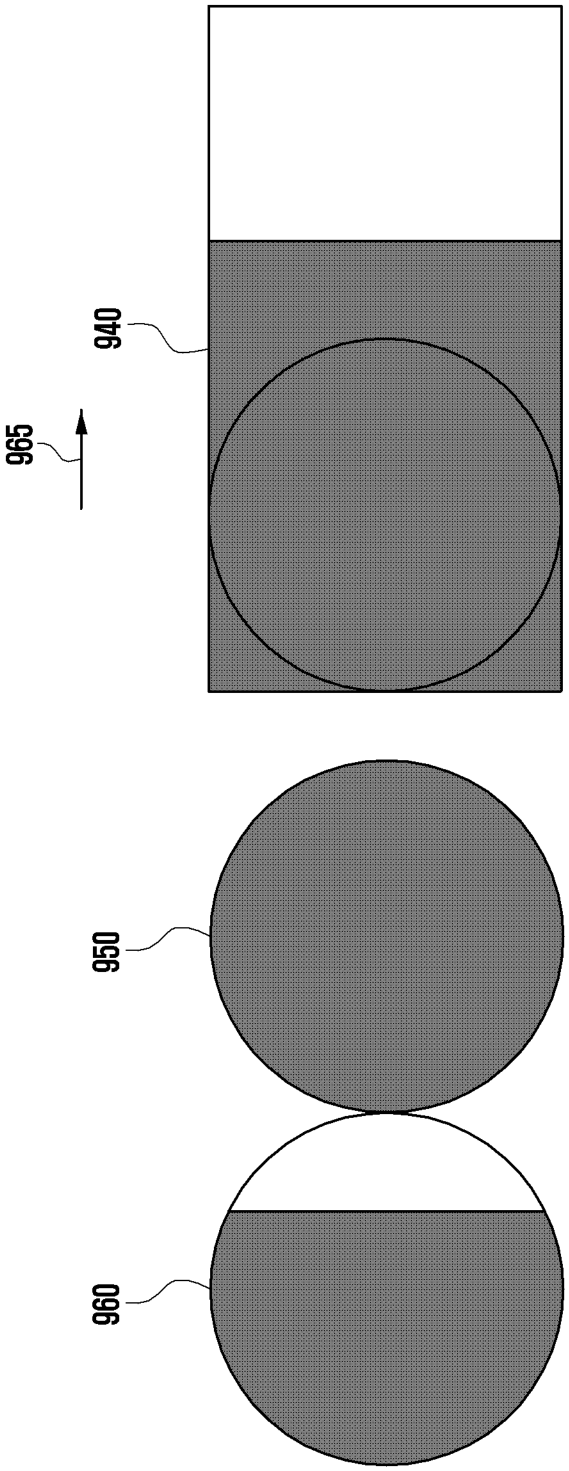

FIG. 9A and FIG. 9B are diagrams illustrating an example correction value reflecting a movement of a display according to various embodiments.

Referring to FIG. 9A, an image 910 may be a part of an image displayed on a display. A part of the image 910 may become an area of interest according to the movement of the display. The image 910 may move, for example, in a first direction 935 (e.g., from the left to the right). FIG. 9A illustrates an area 920 of interest at a first time point and an area 930 of interest at a second time point according to the movement of the display.

Referring to FIG. 9B, an image 940 may be a part of an image displayed on a display. Similarly as in FIG. 9A, a part of the image 940 may become an area of interest according to the movement of the display, and the image 940 may also move in a first direction 965 (e.g., from the left to the right). FIG. 9B illustrates an area 950 of interest at the first time point and an area 960 of interest at the second time point according to the movement of the display.

According to an embodiment, the image 910 in FIG. 9A and the image 940 in FIG. 9B have the same size, and the same color ratio (e.g., a ratio of black and white), but are transversely symmetrical. The transversely symmetrical images may have the same color information included therein. For example, the images may have the same R, G, and B values, and also have the same COPR which is a ratio of R, G, and B.

According to an embodiment, an average value of COPRs may be used as color information on an image. In a case where an average value of COPRs is used as color information on an image, a case where a white image takes 70% of a time and a black image takes 30% of the time, and a case where the white image takes 30% of the time and the black image takes 70% of the time may have the same average value of CORPs when the electronic device reads and corrects an illuminance value. Therefore, the electronic device may compensate for the illuminance value in consideration of a ratio of times taken by images according to the movement of the display.

Referring to FIG. 9A and FIG. 9B, when the image 910 in FIG. 9A and the image 940 in FIG. 9B move at the same speed, the area 920 of interest in FIG. 9A and the area 950 of interest in FIG. 9B are different at the first point, and thus have different color information. At the second time point, the area 930 of interest in FIG. 9A and the area 960 of interest in FIG. 9B may be images which are symmetrical. As described above, symmetrical images may have the same color information. If the electronic device calculates a correction value by only considering color information on the area of interest at the second time point, the correction values calculated in FIG. 9A and FIG. 9B may be the same. However, the area of interest at the first time point may affect the area of interest at the second time point.

According to an embodiment, color information on an area of interest after a previous correction value may affect a correction value. The electronic device may display multiple images according to the movement of the display after calculating a previous correction value, and determine a correction using color information obtained from the multiple images. The electronic device may determine a correction value in further consideration of times for which multiple images are displayed. For example, when the display moves at a constant speed, the electronic device may calculate a correction value using an average value of color information (e.g., CORP W) obtained from the multiple images. As another example, when the movement speed of the display is not constant, the electronic device may calculate a correction value in further consideration of the movement speed of the display using color information obtained from the multiple images. For example, the electronic device may configure, as a weight value (e.g., 0.2 ms→a weight value of 0.1, and 0.4 ms→a weight value of 0.2), a time for which an image is displayed on the display, and calculate a correction value in consideration of the weight value in addition to color information obtained from the multiple images.

According to an embodiment, the processor may receive, as color information on an image, COPR information per one image frame. When the scan rate of the display is 120 Hz, the processor may obtain one piece of COPR information every 8.3 ms. When the processor configures (or determines) 40 ms as a period of the illuminance sensor, the processor may obtain up to five pieces of COPR information, and even when the image is a fixed image, COPR information may change in a direction in which the display moves. In order to correct an illuminance value using COPR information obtained according to display movement and/or image change, the electronic device may obtain, from the memory, COPR information obtained for 40 ms which is a period of the illuminance sensor, and calculate COPR information reflecting times taken by respective images. For example, COPR information obtained at predetermined intervals for 40 ms in a case where three images appear for 40 ms and are displayed on the display for different times, respectively, may be stored in the memory as shown in Table 1 below.

TABLE 1

| | COPR R (Or R) | COPR G (Or G) | COPR B (Or B) | COPR W |
|---|---|---|---|---|
| First image | 255 | 255 | 255 | 166 |
| Second image | 255 | 255 | 255 | 166 |
| Third image | 255 | 0 | 0 | 78 |
| Fourth image | 0 | 0 | 255 | 23 |
| Fifth image | 0 | 0 | 255 | 23 |
| | | | Average value | 91 |

Referring to <Table 1>, five pieces of COPR information may be stored in the memory for 40 ms. The information is stored in the memory as for a first image and a second image, but the images may be the same as or similar to the first image among the three images described above. The first image and the second image may be white images in which COPR R, COPR G, and COPR B are 255, 255, and 255, respectively. A third image may also be the second image among the three images described above, and may be stored only once because the third image is displayed on the display for a short time. The third image may be a red image in which COPR R, COPR G, and COPR B are 255, 0, and 0, respectively. A fourth image and a fifth image may be the same as or similar to the last image among the three images. The fourth image and the fifth image may be blue images in which COPR R, COPR G, and COPR B are 0, 0, and 255, respectively. The electronic device may calculate a correction value (e.g., CORP W) through obtained color information (e.g., COPR R, COPR G, and COPR B) of the images using <Equation 1> below.

$$COPR\ W\frac{Cr}{10000}\times COPR\ R^{2.2}+$$ <Equation 1>

-continued $$\frac{Cg}{10000} \times COPR\,G^{2.2} + \frac{Cb}{10000} \times COPR\,B^{2.2}$$

Herein, Cr, Cg, and Cb may be experimentally obtained coefficients.

The electronic device may adjust a setting (e.g., luminance) of the display, based on the correction value.

Figure 10:
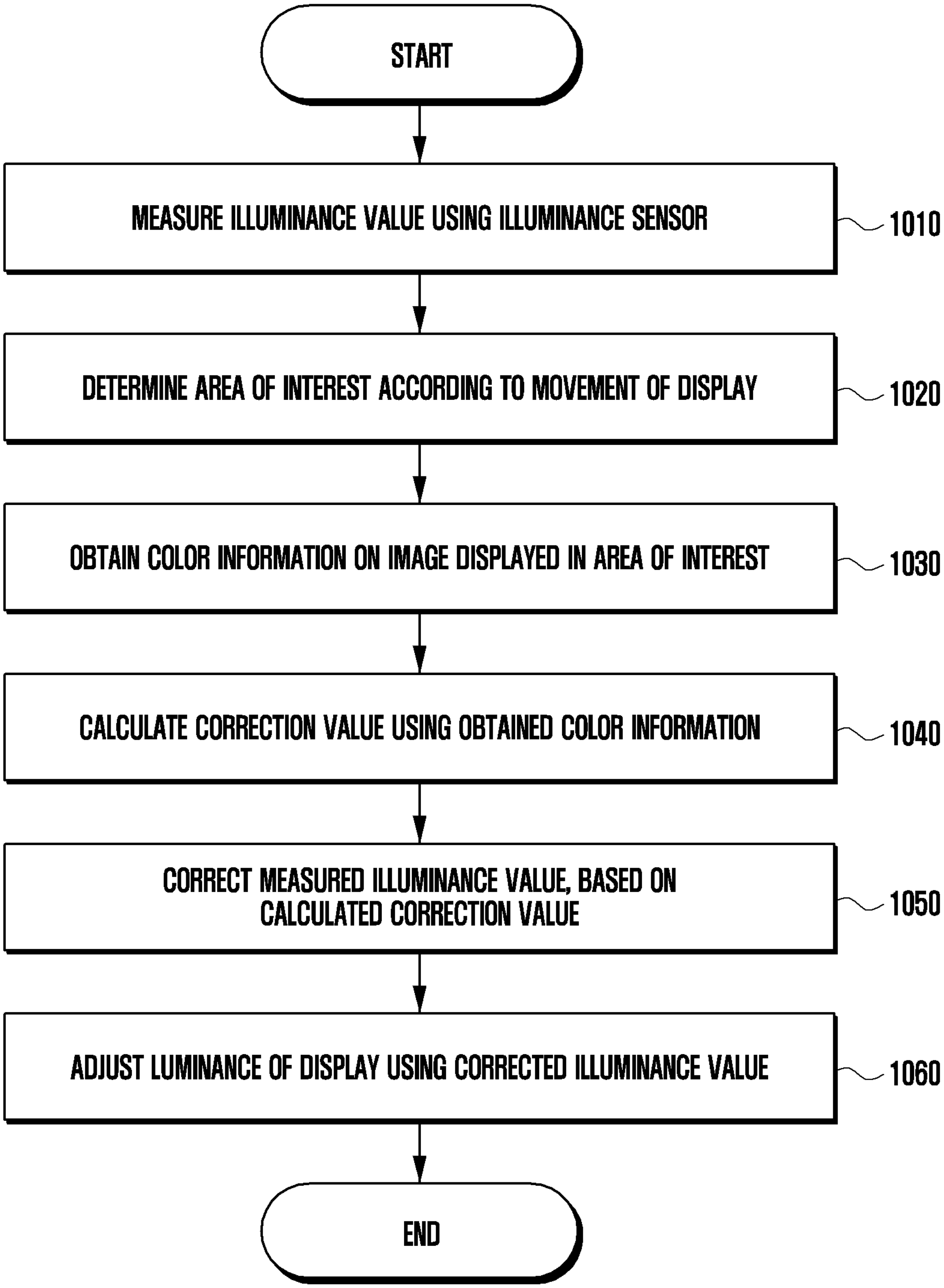
FIG. 10 is a flowchart illustrating an example method of adjusting the luminance of a display according to various embodiments.

FIG. 10 is a flowchart illustrating an example method of adjusting a setting (e.g., luminance) of a display according to various embodiments.

Referring to FIG. 10, an electronic device (e.g., the electronic device 300 in FIG. 3) may, in operation 1010, measure an illuminance value using an illuminance sensor (e.g., the illuminance sensor 310 in FIG. 3). The electronic device 300 may measure an illuminance value according to a predetermined (e.g., specified) period using the illuminance sensor 310. The electronic device 300 may determine the period for measurement of the illuminance value in consideration of the scan rate of an AC light resource and the scan rate of a display. For example, when the scan rate of the display is 60 Hz, the electronic device 300 may configure 40 ms as the period for measurement of the illuminance value so as to distinguish the AC light source therefrom. If the measurement period of the illuminance value is short, it may be difficult to distinguish from the AC light source, and if the measurement period of the illuminance value is long, a corrected illuminance value may not be accurate.

According to an embodiment, the electronic device 300 may, in operation 1020, determine an area of interest according to the movement of the display. The display may be moved by a motor, or may be moved by a physical force of a user. The movement speed of the display may be constant or not constant. The electronic device 300 may determine the movement speed of the display, based on the speed of the motor. The electronic device 300 may also determine the movement speed of the display using a display movement sensing sensor. The electronic device 300 may determine the area of interest in consideration of the movement direction and movement speed of the display. The electronic device 300 may determine the distance by which the display has moved, so as to determine the area of interest.

According to various embodiments, the electronic device 300 may, in operation 1030, obtain color information on an image displayed in the area of interest. The color information on the image displayed in the area of interest may be R, G, and B information. The color information on the image displayed in the area of interest may include a color-on-pixel ratio (COPR) indicating a ratio of R, G, and B.

According to an embodiment, the electronic device 300 may update an image (or an image frame), based on the scan rate of the display. The electronic device 300 may update multiple images according to the scan rate of the display while measuring an illuminance value. The electronic device 300 may obtain color information on the updated multiple images.

According to an embodiment, the electronic device 300 may obtain color information on an image displayed in the area of interest at predetermined time intervals, so as to consider a time for which an image is displayed on the display.

According to an embodiment, the electronic device 300 may obtain color information displayed in the area of interest for a time synchronized with a time for which an illuminance value is measured. The electronic device 300 may synchronize a time for which an illuminance value is measured, with a time for which color information displayed in the area of interest is obtained, so as to prevent and/or reduce erroneous compensation caused by occurrence of a delay.

According to an embodiment, the electronic device 300 may, in operation 1040, calculate a correction value using the obtained color information. The electronic device 300 may calculate the correction value in consideration of the movement speed of the display. For example, when the movement speed of the display is constant, the electronic device 300 may calculate the correction value using an average value of color information obtained from multiple images. As another example, when the movement speed of the display is not constant, the electronic device 300 may assign a weight value to color information obtained from multiple images so as to calculate the correction value. Weight values assigned to multiple images may be determined based on the movement speed of the display.

According to an embodiment, the electronic device 300 may, in operation 1050, correct the measured (or obtained) illuminance value, based on the calculated correction value. For example, the electronic device 300 may read an illuminance value corresponding to the correction value from the memory. As another example, the electronic device 300 may correct the measured illuminance value using an equation using the correction value as a variable.

According to an embodiment, the electronic device 300 may, in operation 1060, adjust (or control) a setting (e.g., luminance) of the display using the corrected illuminance value.

An electronic device according to various example embodiments of the disclosure may include: a first housing, a second housing configured to be movable with respect to the first housing, a flexible display coupled to the first housing or the second housing to be movable together with a coupled housing, an illuminance sensor, and a processor, wherein the processor is configured to: measure an illuminance value using the illuminance sensor, determine an area of interest based on a movement of the flexible display, obtain color information on an image displayed in the area of interest, calculate a correction value using the obtained color information, correct the measured illuminance value based on the calculated correction value, and adjust luminance of the flexible display using the corrected illuminance value.

The electronic device according to various example embodiments of the disclosure may further include: a sensor configured to sense a movement of the flexible display, wherein the processor of the electronic device is configured to determine a movement speed of the flexible display using the sensor, and determine the area of interest based on the determined movement speed.

The electronic device according to various example embodiments of the disclosure may further include a motor configured to move the flexible display, wherein the processor of the electronic device is configured to determine the area of interest based on a speed of the motor.

The processor of the electronic device according to various example embodiments of the disclosure may be configured to calculate the correction value based on a movement speed of the flexible display.

In the electronic device according to various example embodiments of the disclosure the obtained color information may include information on an RGB ratio of each of frames of the displayed multiple images.

The processor of the electronic device according to various example embodiments of the disclosure may be configured to measure an illuminance value based on a period of a first time interval using the illuminance sensor, and obtain color information on multiple image frames displayed in the area of interest for the first time interval to calculate the correction value.

The processor of the electronic device according to various example embodiments of the disclosure may be configured to calculate the correction value further based on a ratio of times for which the multiple image frames displayed in the area of interest are displayed for the first time interval.

The processor of the electronic device according to various example embodiments of the disclosure may be configured to assign a weight value to times for which the multiple image frames displayed in the area of interest are displayed for the first time interval, to calculate the correction value.

The processor of the electronic device according to various example embodiments of the disclosure may be configured to calculate the correction value using an average value of color information on the multiple image frames displayed in the area of interest, the color information being obtained for the first time interval.

The processor of the electronic device according to various example embodiments of the disclosure may be configured to synchronize a time for which the illumination value is measured, with a time for which the color information on the displayed image is obtained.

A method of operating an electronic device according to various example embodiments of the disclosure may include: measuring an illuminance value using an illuminance sensor, determining an area of interest based on a movement of a flexible display, obtaining color information on an image displayed in the area of interest, calculating a correction value using the obtained color information, correcting the measured illuminance value based on the calculated correction value, and adjusting luminance of the flexible display using the corrected illuminance value.

In the method of operating the electronic device according to various example embodiments of the disclosure, the determining of the area of interest may include determining a movement speed of the flexible display using a sensor capable of sensing a movement of the flexible display, and determining the area of interest based on the determined movement speed.

In the method of operating the electronic device according to various example embodiments of the disclosure, the determining of the area of interest may include determining the area of interest based on a speed of a motor configured to move the flexible display.

In the method of operating the electronic device according to various example embodiments of the disclosure, the calculating of the correction value may include calculating the correction value based on a movement speed of the flexible display.

In the method of operating the electronic device according to various example embodiments of the disclosure, the obtained color information may include information on an RGB ratio of each of frames of the displayed multiple images.

In the method of operating the electronic device according to various example embodiments of the disclosure, the obtaining of the color information on the displayed image may further include measuring an illuminance value based on a period of a first time interval using the illuminance sensor, and obtaining color information on multiple image frames displayed in the area of interest for the first time interval.

In the method of operating the electronic device according to various example embodiments of the disclosure, the calculating of the correction value may be calculating the correction value further based on a ratio of times for which the multiple image frames displayed in the area of interest are displayed for the first time interval.

In the method of operating the electronic device according to various example embodiments of the disclosure, the calculating of the correction value may include calculating the correction value through assignment of a weight value to times for which the multiple image frames displayed in the area of interest are displayed for the first time interval.

In the method of operating the electronic device according to various example embodiments of the disclosure, the calculating of the correction value may include calculating the correction value using an average value of color information on the multiple image frames displayed in the area of interest, the color information being obtained for the first time interval.

The method of operating the electronic device according to various example embodiments of the disclosure may further include synchronizing a time for which the illumination value is measured, with a time for which the color information on the displayed image is obtained.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:

a first housing;

a second housing configured to be movable with respect to the first housing;

a flexible display coupled to the first housing or the second housing;

an illuminance sensor disposed under the flexible display;

at least one processor comprising processing circuitry, and memory storing instructions that, when executed by the at least one processor, cause the electronic device to:

measure an illuminance value corresponding to a time at which the flexible display is off, using the illuminance sensor, determine a movement speed of the flexible display, determine an area of interest of the illuminance sensor based on the determined movement speed of the flexible display, obtain color information of multiple images displayed in the area of interest, calculate, based on determining that the movement speed of the flexible display is constant, a correction value using an average value of color information obtained from the multiple images, assign, based on determining that the movement speed of the flexible display is not constant, a weight value to color information obtained from multiple images and calculate the correction value using the color information to which the weight value is assigned, the weight value being determined based on the movement speed of the flexible display, correct the measured illuminance value based on the calculated correction value, and adjust luminance of the flexible display using the corrected illuminance value.

2. The electronic device of claim 1, further comprising a motor configured to move the flexible display, wherein the instructions, when executed by the at least one processor, cause the electronic device to determine the area of interest based on a speed of the motor.

3. The electronic device of claim 1, wherein the obtained color information comprises information on a red, green, blue (RGB) ratio of each of frames of a displayed multiple images.

4. The electronic device of claim 1, wherein the instructions, when executed by the at least one processor, cause the electronic device to:

measure an illuminance value based on a period of a first time interval using the illuminance sensor, and obtain color information on multiple image frames displayed in the area of interest for the first time interval to calculate the correction value.

5. The electronic device of claim 4, wherein the instructions, when executed by the at least one processor, cause the electronic device to calculate the correction value further based on a ratio of times for which the multiple image frames displayed in the area of interest are displayed for the first time interval.

6. The electronic device of claim 5, wherein the instructions, when executed by the at least one processor, cause the electronic device to assign a weight value to times for which the multiple image frames displayed in the area of interest are displayed for the first time interval to calculate the correction value.

7. The electronic device of claim 4, wherein the instructions, when executed by the at least one processor, cause the electronic device to calculate the correction value using an average value of color information on the multiple image frames displayed in the area of interest, the color information being obtained for the first time interval.

8. The electronic device of claim 1, wherein the instructions, when executed by the at least one processor, cause the electronic device to synchronize a time for which the illumination value is measured with a time for which the color information on the displayed image is obtained.

9. A method of operating an electronic device, the method comprising:

measuring an illuminance value using an illuminance sensor;

determining a movement speed of a flexible display;

determining an area of interest of the illuminance sensor based on the determined movement speed of the flexible display;

obtaining color information of multiple images displayed in the area of interest;

calculating, based on determining that the movement speed of the flexible display is constant, a correction value using an average value of color information obtained from the multiple images;

assigning, based on determining that the movement speed of the flexible display is not constant, a weight value to color information obtained from multiple images and calculating the correction value using the color information to which the weight value is assigned, the weight value being determined based on the movement speed of the flexible display;

correcting the measured illuminance value based on the calculated correction value; and adjusting luminance of the flexible display using the corrected illuminance value.

10. The method of claim 9, wherein the determining of the area of interest includes determining the area of interest based on a speed of a motor configured to move the flexible display.

11. The method of claim 9, wherein the obtained color information comprises information on a red, green, blue (RGB) ratio of each of frames of the displayed multiple images.

12. The method of claim 9, wherein the obtaining of the color information on the displayed image further comprises:

measuring an illuminance value based on a period of a first time interval using the illuminance sensor; and obtaining color information on multiple image frames displayed in the area of interest for the first time interval.

13. The method of claim 12, wherein the calculating of the correction value includes calculating the correction value further based on a ratio of times for which the multiple image frames displayed in the area of interest are displayed for the first time interval.

14. The method of claim 13, wherein the calculating of the correction value includes calculating the correction value through assignment of a weight value to times for which the multiple image frames displayed in the area of interest are displayed for the first time interval.

15. The method of claim 12, wherein the calculating of the correction value includes calculating the correction value using an average value of color information on the multiple image frames displayed in the area of interest, the color information being obtained for the first time interval.

16. The method of claim 9, further comprising synchronizing a time for which the illumination value is measured with a time for which the color information on the displayed image is obtained.

* * * * *